United States Patent
Burke

(10) Patent No.: US 11,193,571 B1
(45) Date of Patent: Dec. 7, 2021

(54) DIFFERENTIAL ACTUATOR

(71) Applicant: Schaeffler Technologies AG & Co. KG, Herzogenaurach (DE)

(72) Inventor: Peter Burke, Charlotte, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 18 days.

(21) Appl. No.: 16/920,472

(22) Filed: Jul. 3, 2020

(51) Int. Cl.
*F16H 48/10* (2012.01)
*F16H 48/40* (2012.01)
*F16H 19/00* (2006.01)
*F16H 48/20* (2012.01)

(52) U.S. Cl.
CPC .......... *F16H 48/10* (2013.01); *F16H 19/001* (2013.01); *F16H 48/40* (2013.01); *F16H 2048/102* (2013.01); *F16H 2048/204* (2013.01)

(58) Field of Classification Search
CPC ......... F16H 2048/204; F16H 2048/102; F16H 48/40; F16H 48/10; F16H 19/001
See application file for complete search history.

(56) References Cited

U.S. PATENT DOCUMENTS

| | | | | |
|---|---|---|---|---|
| 4,877,113 A * | 10/1989 | Taig | ...................... | B60T 13/741 188/82.84 |
| 8,578,764 B2 * | 11/2013 | Stefina | .................... | F16H 59/68 73/115.02 |
| 8,672,284 B2 * | 3/2014 | Klinke | .................... | F16H 1/225 248/422 |
| 8,840,507 B2 * | 9/2014 | Himmelmann | ..... | F16H 25/2021 475/156 |
| 9,630,696 B2 * | 4/2017 | Ooshita | .................. | B63H 20/14 |
| 10,197,135 B2 * | 2/2019 | Yelvington | ............. | B62L 1/005 |
| 10,253,857 B2 * | 4/2019 | LaForce | .................. | F16H 15/28 |
| 10,814,904 B2 * | 10/2020 | Washnock | ........... | B62D 5/0454 |

* cited by examiner

*Primary Examiner* — David M Fenstermacher

(57) ABSTRACT

A differential actuator including: a shuttle supported for rotation around a central axis and including a body portion, a first pinion gear connected to the body portion, and a second pinion gear connected to the body portion; a first component including a first plurality of teeth meshed with the first pinion gear and supported for rotation around the central axis; and a second component including a second plurality of teeth meshed with the second pinion gear and supported for rotation around the central axis. For a first operating mode of the differential actuator: the shuttle is arranged to be rotated by an actuator in a first circumferential direction around the central axis; and the first pinion gear is arranged to rotate the first component in the first circumferential direction around the central axis.

20 Claims, 14 Drawing Sheets

DIFFERENTIAL ACTUATOR

TECHNICAL FIELD

The present disclosure relates to a differential actuator configured to control rotation of multiple components to selectively execute multiple operations.

BACKGROUND

In some known mechanical systems, it is necessary to selectively execute multiple operations. It is known to use multiple actuators and sensors to select the operations. However, the use of multiple actuators and sensors is costly, increases complexity, and reduces reliability of the systems.

SUMMARY

According to aspects illustrated herein, there is provided a differential actuator, including: a shuttle supported for rotation around a central axis and including a body portion, a first pinion gear connected to the body portion, and a second pinion gear connected to the body portion; a first component including a first plurality of teeth meshed with the first pinion gear and supported for rotation around the central axis; and a second component including a second plurality of teeth meshed with the second pinion gear and supported for rotation around the central axis. For a first operating mode of the differential actuator: the shuttle is arranged to be rotated by an actuator in a first circumferential direction around the central axis; and the first pinion gear is arranged to rotate the first component in the first circumferential direction around the central axis.

According to aspects illustrated herein, there is provided a differential actuator, including: a shuttle supported for rotation around a central axis, the shuttle including a body portion, a first pinion gear connected the body portion, and a second pinion gear connected to the body portion; a first component supported for rotation around the central axis and including a first plurality of teeth meshed with the first pinion gear, and a second component supported for rotation around the central axis and including a second plurality of teeth meshed with the second pinion gear. For a first operating mode of the differential actuator: the shuttle is arranged to be rotated, by an actuator, in a first circumferential direction around the central axis; the first pinion gear is arranged to rotate the first component in the first circumferential direction; the second pinion gear is arranged to rotate the second component in the first circumferential direction; facing the differential actuator in an axial direction parallel to the central axis, the first pinion gear is arranged to rotate in one of a clockwise or counter-clockwise direction with respect to the body portion; and facing the differential actuator in the axial direction, the second pinion gear is arranged to rotate in the other of the clockwise or counter-clockwise direction with respect to the body portion. For a second operating mode of the differential actuator: the shuttle is arranged to be rotated, by the actuator, in a second circumferential direction, opposite the first circumferential direction, around the central axis; and the shuttle is arranged to rotate the first component, and not the second component, in the second circumferential direction around the central axis.

According to aspects illustrated herein, there is provided a method of operating a differential actuator including a shuttle with a body portion, a first pinion gear connected to the body portion, a second pinion gear connected to the body portion, a first component including a first plurality of teeth meshed with the first pinion gear, and a second component including a second plurality of teeth meshed with the second pinion gear. The method includes: rotating, with an actuator, the shuttle in a circumferential direction around a central axis; facing the differential actuator in an axial direction parallel to the central axis, rotating the first pinion gear in one of a clockwise or counter-clockwise direction with respect to the body portion; and rotating, with the first pinion gear, the first component in the circumferential direction around the central axis.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

The conjunction "or" is not used as an "exclusive or" in the present disclosure. For example, the following conditions satisfy the phase, "element X or element Y": element X and not element Y; element Y and not element X; and element X and element Y.

Figure 1:
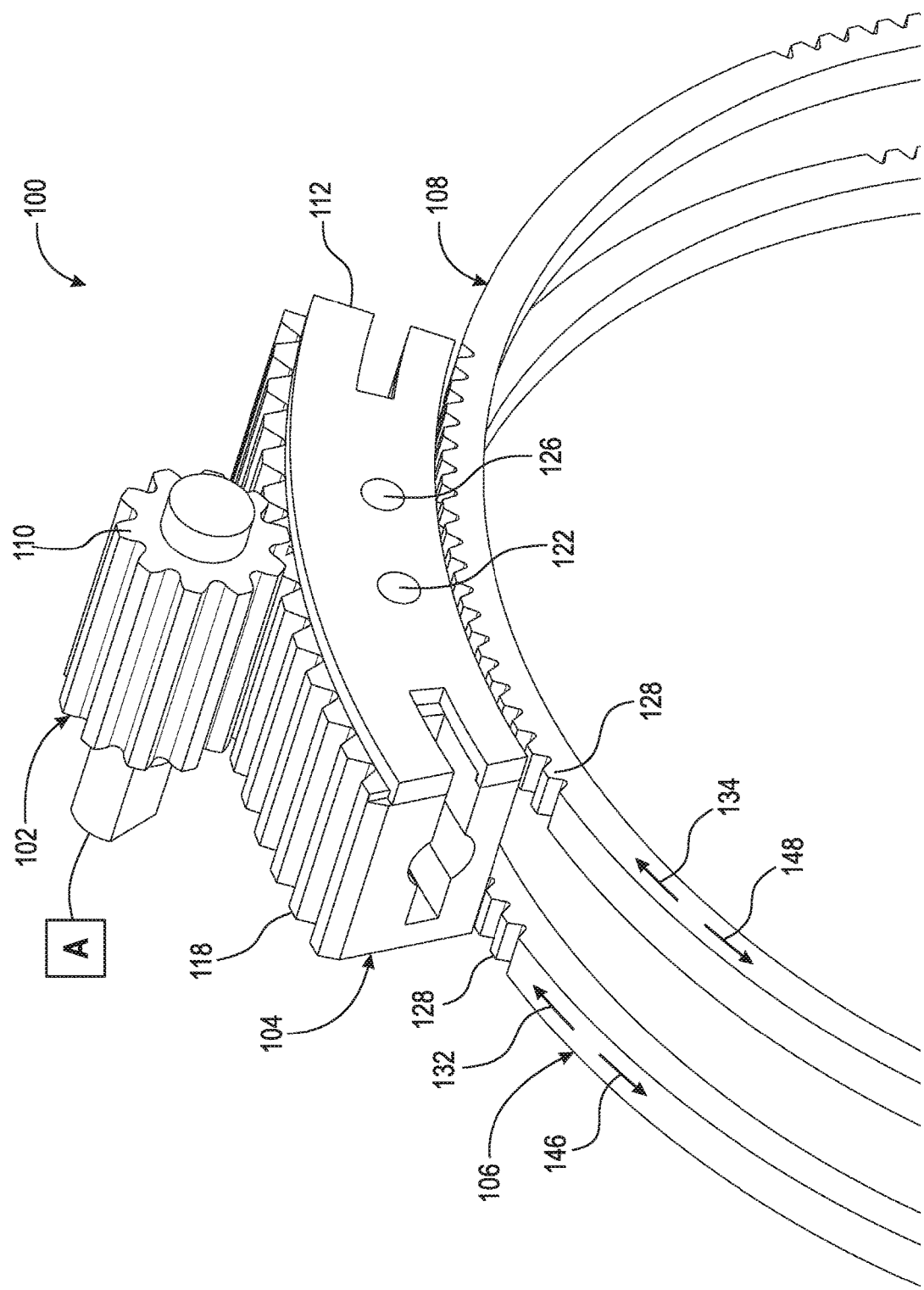
FIG. 1 is a front isometric view of an example embodiment of a differential actuator in a neutral state.

FIG. 1 is a front isometric view of an example embodiment of a differential actuator in a neutral state.

Figure 2:
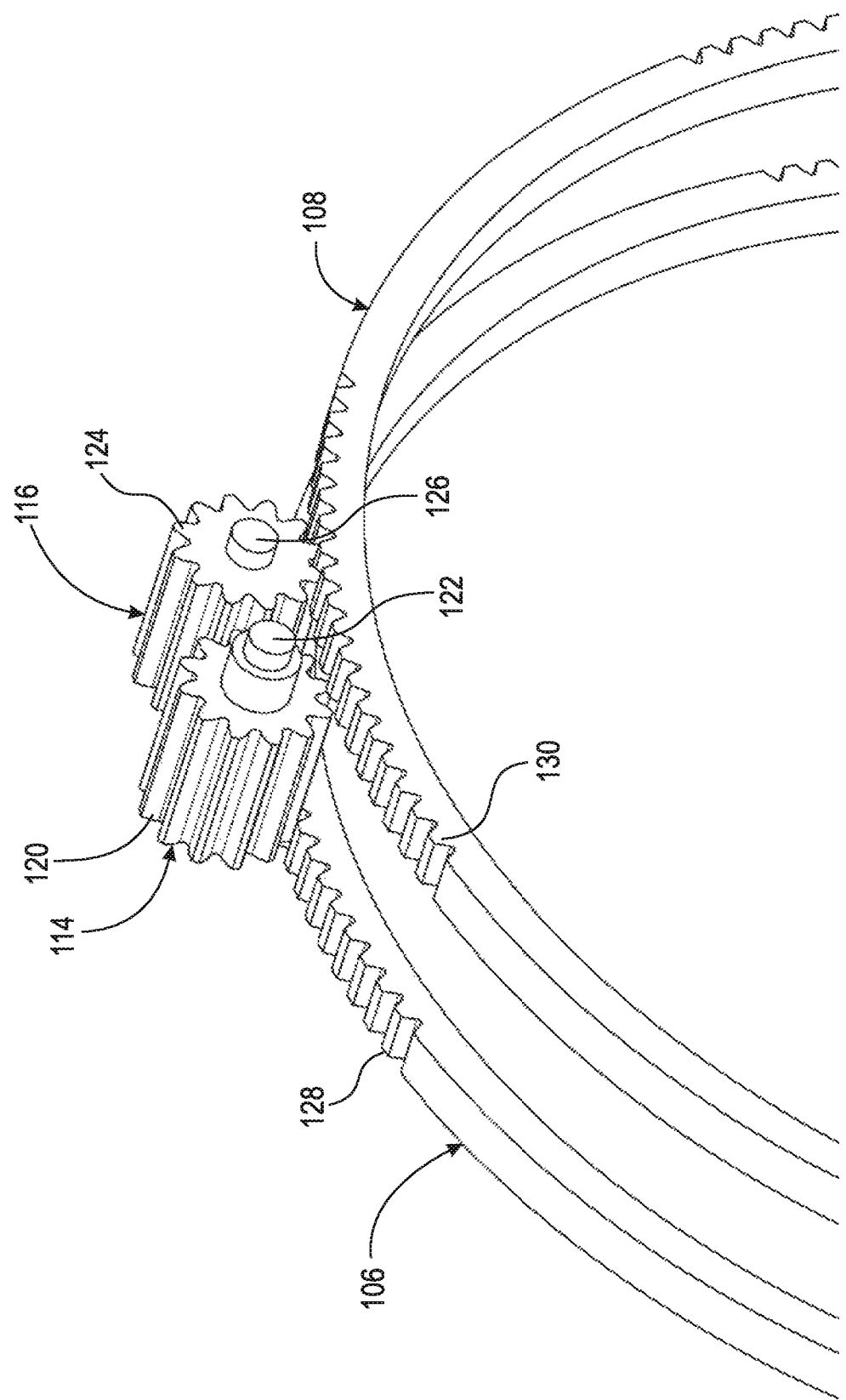
FIG. 2 is the front isometric view of FIG. 1 with a shuttle and an input gear removed.

FIG. 2 is the front isometric view of the differential actuator shown in FIG. 1 with a shuttle and an input gear removed.

Figure 3:
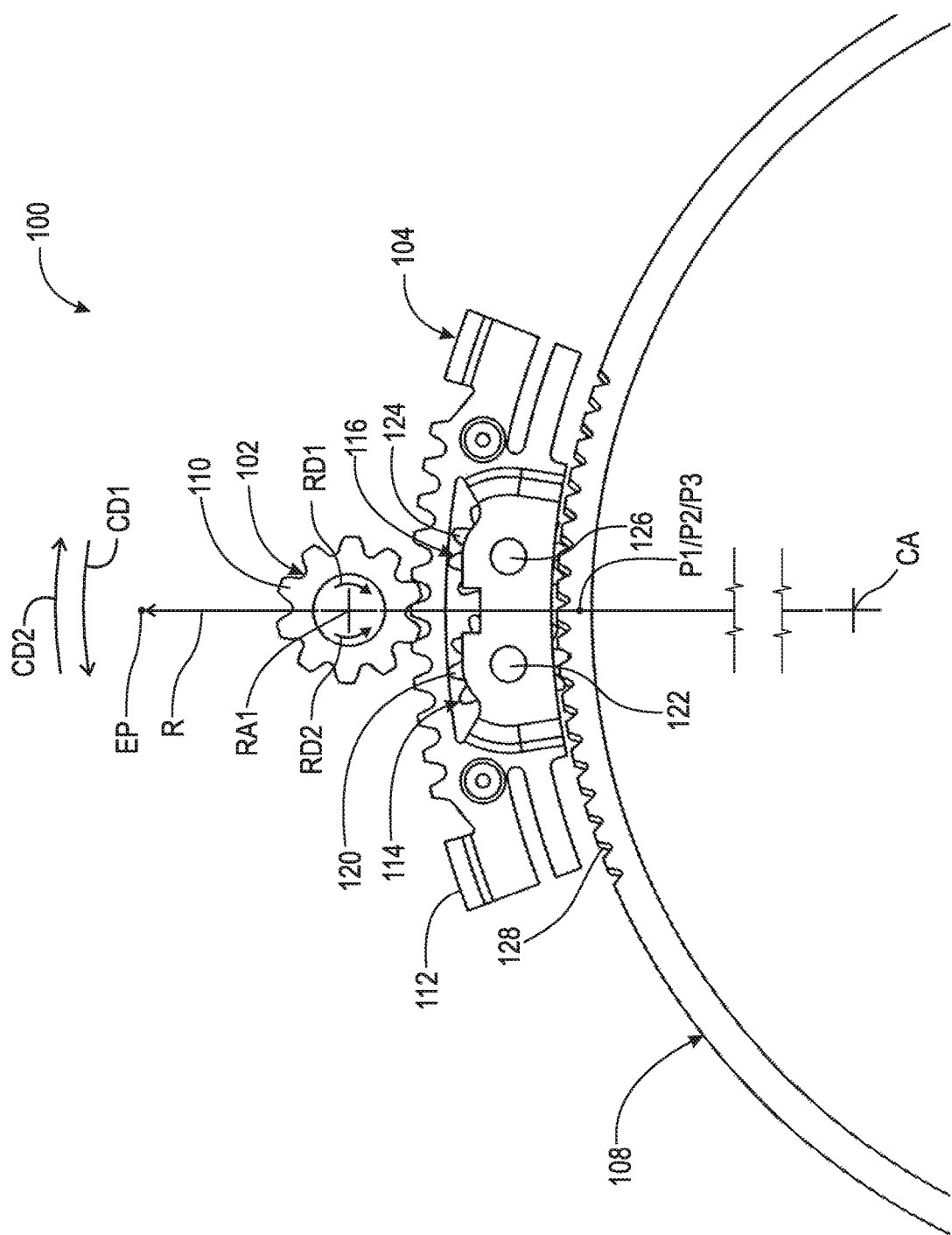
FIG. 3 is a front view of the differential actuator shown in FIG. 1.

FIG. 3 is a front view of the differential actuator shown in FIG. 1. The following should be viewed in light of FIGS. 1 through 3. In FIG. 1, differential actuator 100 includes input gear 102, shuttle 104, component 106, and component 108. Input gear 102 includes gear teeth 110 and is rotatable around rotational axis RA1 by actuator A. Actuator A is schematically depicted in FIG. 1. Shuttle 104 is supported for rotation around central axis CA and includes body portion 112, pinion gear 114, and pinion gear 116.

Component 106 and component 108 are axially stacked, or axially offset, in FIG. 1. For example, component 106 and component 108 axially overlap in axial direction AD parallel to axis CA; and hypothetical line L1, in axial direction AD1 parallel to axis CA, passes through component 106 and component 108. In the example of FIG. 1, gear 114 and gear 116 are axially offset. For example: gear 114 extends past gear 116 in direction AD1; and gear 116 extends past gear 114 in axial direction AD2, opposite direction AD1. The portions of components 106 and 108 visible in FIG. 1 form respective circular arcs.

Body portion 112 includes teeth 118 meshed with gear teeth 110. Pinion gear 114 is connected to body portion 112 and includes gear teeth 120. In the example of FIG. 1, actuator 100 includes gear axle 122 fixed to gear 114, connected to body portion 112, and rotatable with respect to body portion 112. Pinion gear 116 is connected to body portion 112 and includes gear teeth 124. In the example of FIG. 1, a-ctuator 100 includes gear axle 126 fixed to gear 116, connected to body portion 112, and rotatable with respect to body portion 112. Component 106 includes teeth 128 meshed with gear teeth 120. Component 108 includes teeth 130 meshed with gear teeth 124. In the example of FIG. 1, input gear 102 is circumferentially fixed around central axis CA. For example, a circumferential position of axis RA1, around central axis CA is fixed.

The neutral position of differential actuator 100 in FIG. 1 is a frame of reference for the operating modes of differential actuator 100 described below. In the neutral position of FIG. 1, plane P is co-linear with CA and passes through axis RA1, point P1 on component 106, and point P2 on component 108. Points P1 and P2 are axially stacked with point P3 on plane P. Alternately stated, in FIG. 1, points P1, P2, and P3 overlap in an axial directions AD1 and AD2. Due to the axial stacking of components 106 and 108, it is understood that in the front views of actuator 100, a circumferential position of point P1 is shown on component 108. For example: the starting point for the implementation of the operating modes described below is the neutral position of differential actuator 100; and an amount of rotation of components 106 and 108 is measured from point P3 on plane P to points P1 and P2, respectively, in circumferential direction CD1.

Except as noted, for an operating mode of differential actuator 100 shown in FIG. 1: input gear 102 is arranged to be rotated by actuator A in one of opposite rotational directions RD1 or RD2 around axis RA1; input gear 102 is arranged to rotate body portion 112 in one of opposite circumferential directions CD1 or CD2 around central axis CA; and pinion gear 114 and pinion gear 116 are arranged to rotate at least one of component 106 or component 108 around central axis CA in direction CD1 or CD2. Circumferential directions CD1 and CD2 are illustrated by end point EP, on plane P, rotated counter-clockwise and clockwise, respectively, around central axis CA. Pinion gear 114 and pinion gear 116 are independently rotatable. For example: teeth 120 are not meshed with teeth 124; and as described below, for some modes of operation of differential actuator 100, rotation of shuttle 104 causes pinion gear 114 and pinion gear 116 to rotate at different speeds and in different relative directions.

An amount of rotation of shuttle 104 in directions CD1 and CD2 is determined at least in part by respective numbers and sizes of teeth 110 and 118. An amount of rotation of component 106 in directions CD1 and CD2 is determined at least in part by respective numbers and sizes of teeth 120 and 128. An amount of rotation of component 108 in directions CD1 and CD2 is determined at least in part by respective numbers and sizes of teeth 124 and 130. The numbers and sizes discussed above are selectable according to desired operation of differential actuator 100. In the example of FIG. 1: pinion gear 114 and pinion gear 116 have a same number and size of teeth 120 and 124, respectively; and component 106 and component 108 have a same number and size of teeth 128 and 130, respectively.

Figure 4:
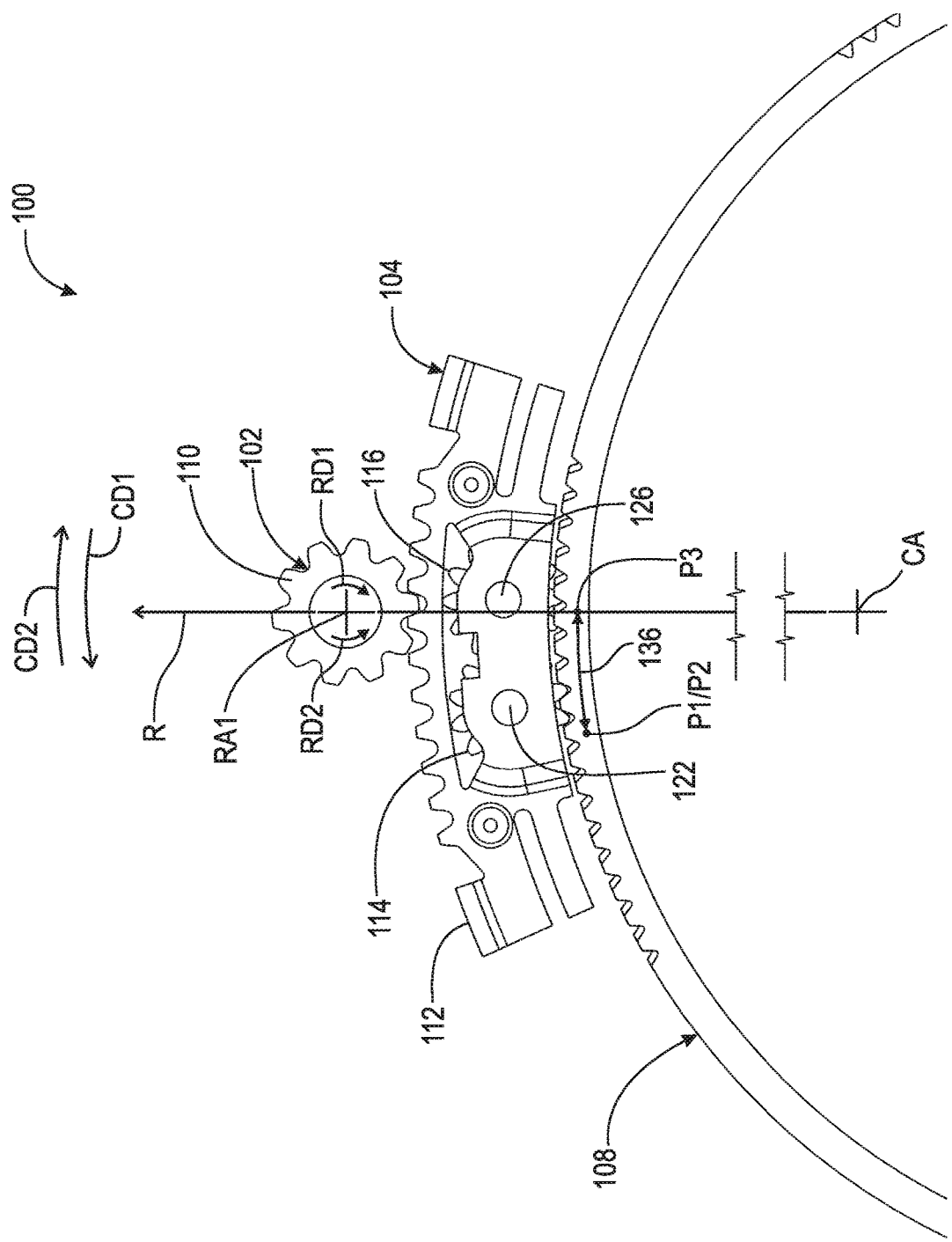
FIG. 4 is a front view of the differential actuator shown in FIG. 1 in a first operating mode.

FIG. 4 is a front view of differential actuator 100 shown in FIG. 1 in a first operating mode. For the first operating mode: component 106 and component 108 are rotatable at least in direction CD1; resistance 132 of component 106 to rotation in direction CD1 is substantially equal to resistance 134 of component 108 to rotation in direction CD1 in the neutral position; actuator A is arranged to rotate input gear 102 in rotational direction RD1; the meshing of teeth 110 and teeth 118 rotates shuttle 104 in direction CD1; and pinion gear 114 and pinion gear 116 rotate component 106 and component 108 in direction CD1, respectively. Since resistance 132 is substantially equal to resistance 134, there is no relative rotation between component 106 and component 108 in direction CD1, and rotation of pinion gear 114 and pinion gear 116 with respect to body portion 112 is blocked. Thus, component 106 and component 108 rotate in unison and by same circumferential distance 136 in direction CD1.

Figure 5:
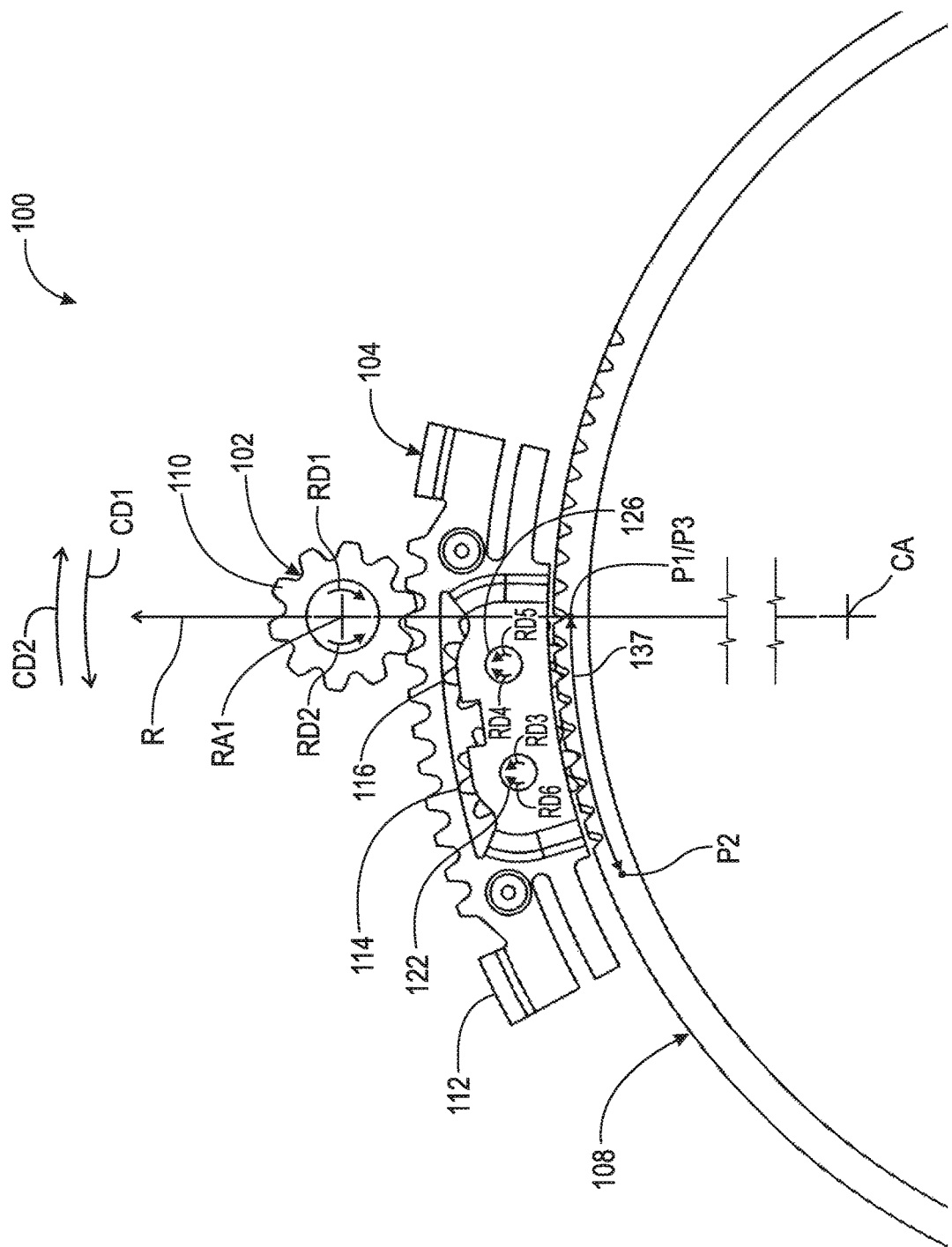
FIG. 5 is a front view of the differential actuator shown in FIG. 1 in a second operating mode.

FIG. 5 is a front view of differential actuator 100 shown in FIG. 1 in a second operating mode. For the second operating mode: rotation of component 106 in direction CD1 is blocked; component 108 is free to rotate at least in direction CD1; actuator A is arranged to rotate input gear 102 in rotational direction RD1; the meshing of teeth 110 and teeth 118 rotates shuttle 104 in direction CD1; and pinion gear 116 rotates component 108 in direction CD1. Because rotation of component 106 in direction CD1 is blocked and component 108 is free to rotate at least in direction CD1, there is relative movement between component 108 and component 106, causing pinion gear 114 and pinion gear 116 to rotate with respect to body portion 112.

The rotation of shuttle 104 in direction CD1 causes pinion gear 116 to rotate in rotational direction RD4 with respect to body portion 112, rotating component 108 circumferential distance 137 in direction CD1. As shuttle 104 is rotated in direction CD1, blocked component 106 causes pinion gear 114 to rotate in rotational direction RD3 with respect to body portion 112 and to traverse fixed component 106 in direction CD1.

Figure 6:
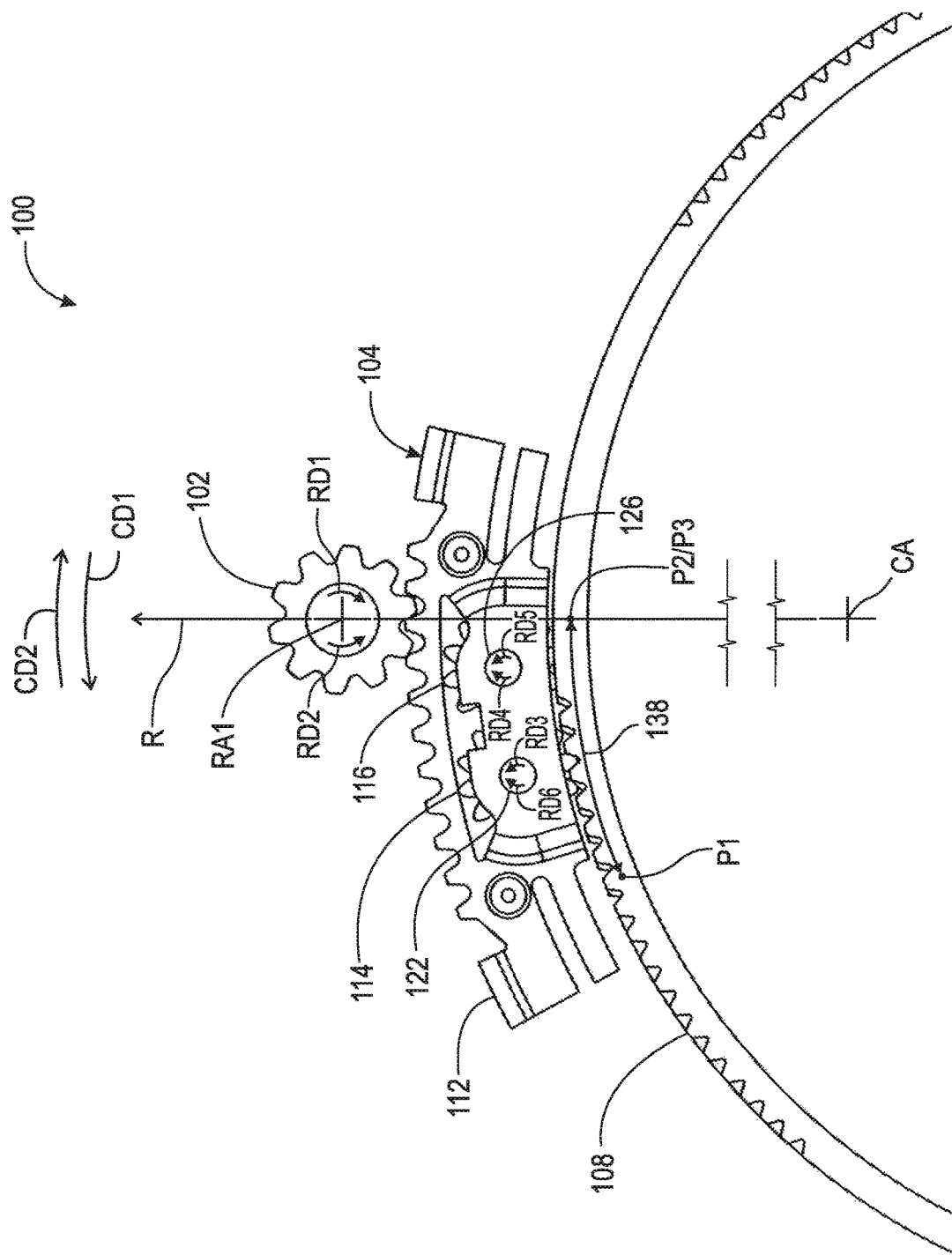
FIG. 6 is a front view of the differential actuator shown in FIG. 1 in a third operating mode.

FIG. 6 is a front view of differential actuator 100 shown in FIG. 1 in a third operating mode. For the third operating mode: rotation of component 108 in direction CD1 is blocked; component 106 is free to rotate at least in direction CD1; actuator A is arranged to rotate input gear 102 in rotational direction RD1; the meshing of teeth 110 and teeth 118 rotates shuttle 104 in direction CD1; and pinion gear 114 rotates component 106 in direction CD1. Because component 108 is rotationally blocked in direction CD1 and component 106 is free to rotate at least in direction CD1, there is relative rotation between component 106 and component 108, causing pinion gear 114 and pinion gear 116 to rotate with respect to body portion 112.

The rotation of shuttle 104 in direction CD1 causes pinion gear 114 to rotate in rotational direction RD6 with respect to body portion 112, rotating component 106 circumferential distance 138 in direction CD1. As shuttle 104 is rotated in direction CD1, blocked component 108 causes pinion gear 116 to rotate in rotational direction RD5 with respect to body portion 112 and to traverse fixed component 108 in direction CD1.

Figure 7:
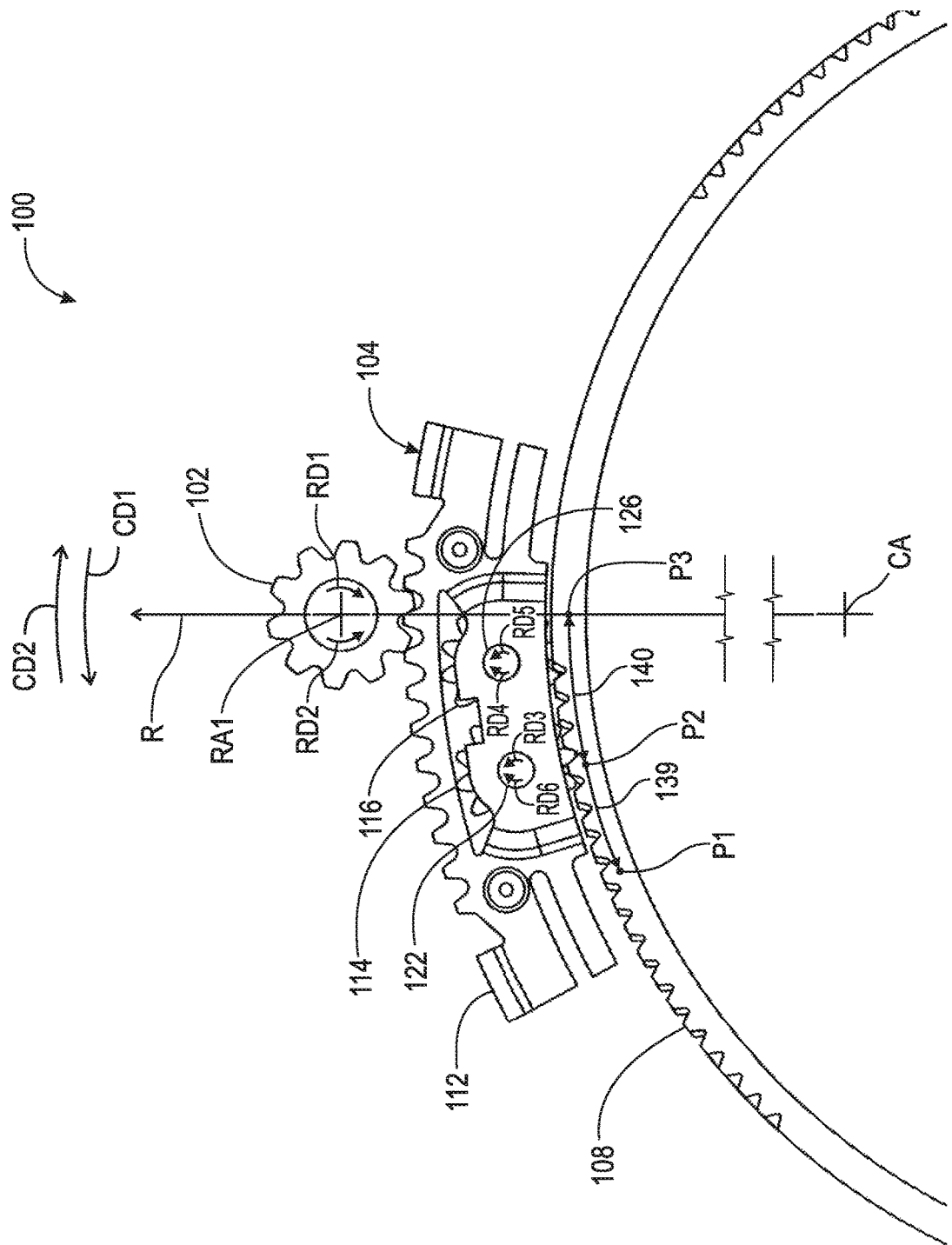
FIG. 7 is a front view of the differential actuator shown in FIG. 1 in a fourth operating mode.

FIG. 7 is a front view of differential actuator 100 shown in FIG. 1 in a fourth operating mode. For the fourth operating mode: component 106 and component 108 are free to rotate at least in direction CD1; resistance 132 of component 106 to rotation in direction CD1 is less than resistance 134 of component 108 to rotation in direction CD1; actuator A is arranged to rotate input gear 102 in rotational direction RD1; the rotation of input gear 102 rotates shuttle 104 in direction CD1; and pinion gear 114 and pinion gear 116 rotate component 106 and component 108, respectively, in direction CD1.

As shuttle 104 is rotated in direction CD1: pinion gear 114 is rotated in rotational direction RD6 with respect to body portion 112, rotating component 106 in direction CD1; and pinion gear 116 is rotated in rotational direction RD5 with respect to body portion 112, rotating component 108 in direction CD1. Since resistance 132 is less than resistance 134: pinion gear 114 rotates more rapidly than pinion gear 116; pinion gear 114 rotates component 106 by circumferential distance 139 in direction CD1; pinion gear 116 rotates component 108 by circumferential distance 140 in direction CD1; distance 139 is greater than distance 140; and a rate of rotation of component 106 in direction CD1 is greater than a rate of rotation of component 108 in direction CD1.

Figure 8:
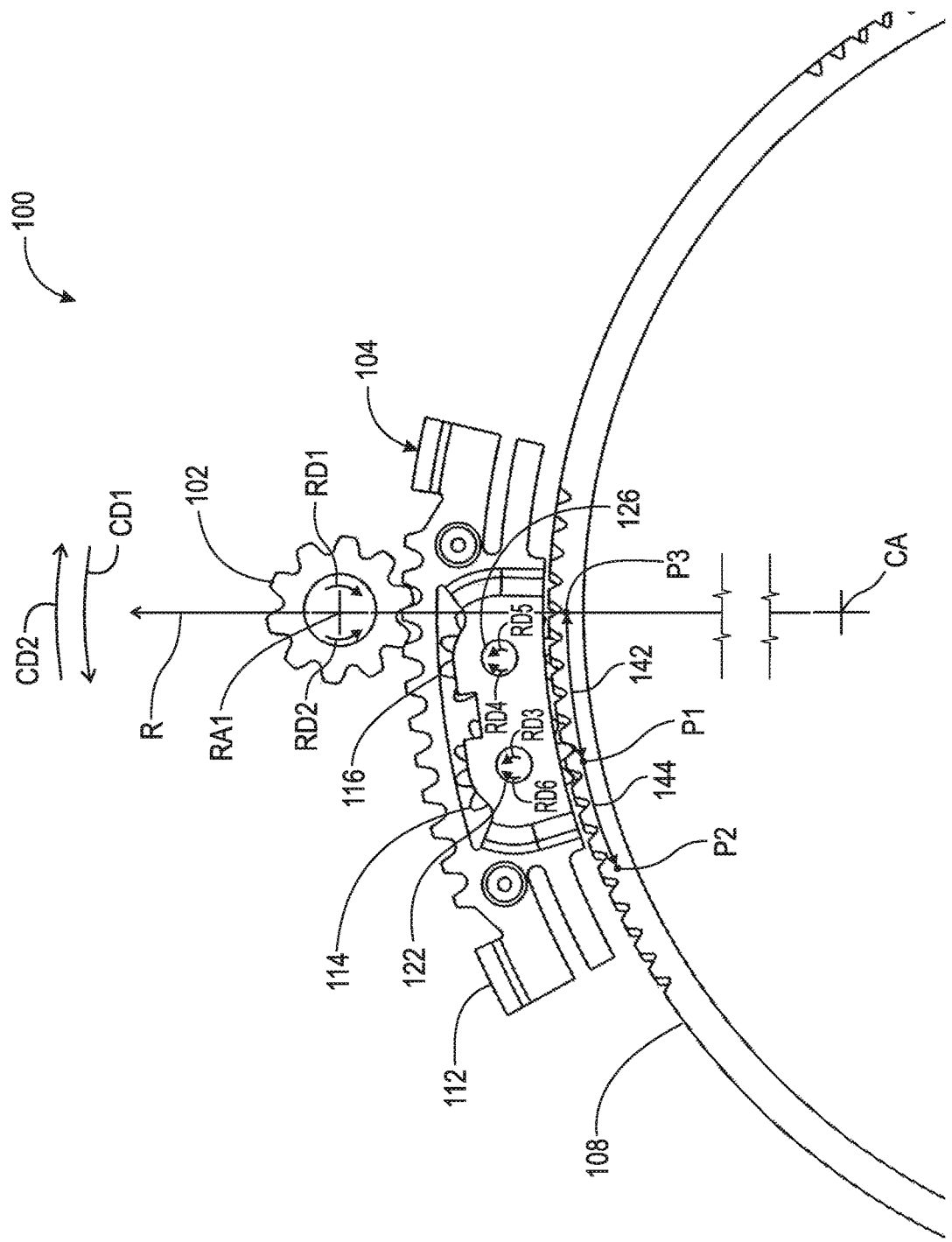
FIG. 8 is a front view of the differential actuator shown in FIG. 1 in a fifth operating mode.

FIG. 8 a front view of differential actuator 100 shown in FIG. 1 in a fifth operating mode. For the fifth operating mode: component 106 and component 108 are rotatable at least in direction CD1; resistance 132 of component 106 to rotation in direction CD1 is greater than resistance 134 of component 108 to rotation in direction CD1; actuator A is arranged to rotate input gear 102 in rotational direction RD1; the meshing of teeth 110 and teeth 118 rotates shuttle 104 in direction CD1; and pinion gear 114 and pinion gear 116 rotate component 106 and component 108, respectively, in direction CD1.

As shuttle 104 is rotated in direction CD1: pinion gear 114 is rotated in rotational direction RD3 with respect to body portion 112, rotating component 106 in direction CD1; and pinion gear 116 is rotated in rotational direction RD4 with respect to body portion 112, rotating component 108 in direction CD1. Since resistance 134 is less than resistance 132: pinion gear 116 rotates more rapidly than pinion gear 114; pinion gear 114 rotates component 106 by circumferential distance 142 in direction CD1; pinion gear 116 rotates component 108 by circumferential distance 144 in direction CD1; distance 144 is greater than distance 142; and a rate of rotation of component 108 in direction CD1 is greater than a rate of rotation of component 106 in direction CD1.

FIG. 3 also depicts the differential actuator shown in FIG. 1 in a sixth operating mode. For the sixth operating mode, rotation of component 106 and component 108 in direction CD1 is blocked. Since rotation of component 106 and component 108 in direction CD1 is blocked, when rotational energy is applied to input gear 102 in direction RD1, there is no relative rotation between component 106 and component 108 in direction CD1, which blocks rotation of pinion gears 114 and 116 with respect to body portion 112, which blocks rotation of shuttle 104 in direction CD1.

The inverse of the rotations and rotations discussed above for the first through sixth operating modes is generally applicable to seventh through twelfth operating modes, respectively, of differential actuator 100 shown in FIG. 1. As with the first through sixth operating modes, the neutral position shown in FIG. 3 is the starting point for the seventh through twelfth operating modes.

For the seventh operating mode of differential actuator 100 shown in FIG. 1: component 106 and component 108 are free to rotate at least in direction CD2; resistance 146 of component 106 to rotation in direction CD2 is substantially equal to resistance 148 of component 108 to rotation in direction CD2; actuator A is arranged to rotate input gear 102 in rotational direction RD2; since teeth 110 and teeth 118 are meshed, the rotation of input gear 102 rotates shuttle 104 in direction CD2; and pinion gear 114 and pinion gear 116 rotate component 106 and component 108 in direction CD2. Since resistance 146 is substantially equal to resistance 148, there is no relative rotation between component 106 and component 108 in direction CD2, and rotation of pinion gear 114 and pinion gear 116 with respect to body portion 112 is blocked. Thus, component 106 and component 108 rotate in unison and by a same circumferential distance in direction CD1.

For the eighth operating mode of differential actuator 100 shown in FIG. 1: rotation of component 106 in direction CD2 is blocked; component 108 is free to rotate at least in direction CD2; actuator A is arranged to rotate input gear 102 in rotational direction RD2; since teeth 110 and teeth 118 are meshed, the rotation of input gear 102 rotates shuttle 104 in direction CD2; and pinion gear 116 rotates component 108 in direction CD2. Because rotation of component 106 in direction CD2 is blocked and component 108 is free to rotate at least in direction CD2, there is relative movement between component 108 and component 106, causing pinion gear 114 and pinion gear 116 to rotate with respect to body portion 112.

The rotation of shuttle 104 in direction CD2 causes pinion gear 116 to rotate in rotational direction RD5 with respect to body portion 112, rotating component 108 in direction CD2. As shuttle 104 is rotated in direction CD2, blocked component 106 causes pinion gear 114 to rotate in rotational direction RD6 with respect to body portion 112 and to traverse fixed component 106 in direction CD2.

For the ninth operating mode of differential actuator 100 shown in FIG. 1: rotation of component 108 in direction CD2 is blocked; component 106 is free to rotate at least in direction CD2; actuator A is arranged to rotate input gear 102 in rotational direction RD2; the rotation of input gear 102 rotates shuttle 104 in direction CD2; and pinion gear 114 rotates component 106 in direction CD2. Because rotation of component 108 in direction CD2 is blocked and component 106 is free to rotate at least in direction CD2, there is relative movement between component 106 and component 108, causing pinion gear 114 and pinion gear 116 to rotate with respect to body portion 112.

The rotation of shuttle 104 in direction CD2 causes pinion gear 114 to rotate in rotational direction RD3 with respect to body portion 112, rotating component 106 in direction CD2. As shuttle 104 is rotated in direction CD2, blocked component 108 causes pinion gear 116 to rotate in rotational direction RD4 with respect to body portion 112 and to traverse fixed component 108 in direction CD2.

For the tenth operating mode of differential actuator 100 shown in FIG. 1: component 106 and component 108 are free to rotate at least in direction CD2; a resistance of component 106 to rotation in direction CD2 is less than a resistance of component 108 to rotation in direction CD2; actuator A is arranged to rotate input gear 102 in rotational direction RD2; the rotation of input gear 102 rotates shuttle 104 in direction CD2; and pinion gear 114 and pinion gear 116 rotate component 106 and component 108, respectively, in direction CD2.

As shuttle 104 is rotated in direction CD2: pinion gear 114 is rotated in rotational direction RD3 with respect to body portion 112, rotating component 106 in direction CD2; and pinion gear 116 is rotated in rotational direction RD4 with respect to body portion 112, rotating component 108 in direction CD2. Since the resistance of component 106 to rotation in direction CD2 is less than the resistance of component 108 to rotation in direction CD2: pinion gear 114 rotates more rapidly than pinion gear 116; pinion gear 114 rotates component 106 by a greater distance in direction CD2 than pinion gear 116 rotates component 108 in direction CD2; and a rate of rotation of component 106 in direction CD2 is greater than a rate of rotation of component 108 in direction CD2.

For the eleventh operating mode of differential actuator 100 shown in FIG. 1: component 106 and component 108 are free to rotate at least in direction CD2; a resistance of component 106 to rotation in direction CD2 is greater than a resistance of component 108 to rotation in direction CD2; actuator A is arranged to rotate input gear 102 in rotational direction RD2; the rotation of input gear 102 rotates shuttle 104 in direction CD2; and pinion gear 114 and pinion gear 116 rotate component 106 and component 108, respectively, in direction CD2.

As shuttle 104 is rotated in direction CD2: pinion gear 114 is rotated in rotational direction RD6, rotating component 106 in direction CD2; and pinion gear 116 is rotated in rotational direction RD5, rotating component 108 in direction CD2. Since resistance of component 106 to rotation in direction CD2 is greater than resistance of component 108 to rotation in direction CD2: pinion gear 116 rotates more rapidly than pinion gear 114; pinion gear 116 rotates component 108 by a greater distance in direction CD2 than pinion gear 114 rotates component 106 in direction CD2; and a rate of rotation of component 108 in direction CD2 is greater than a rate of rotation of component 106 in direction CD2.

FIG. 3 substantially depicts the differential actuator shown in FIG. 1 in the twelfth operating mode. For the twelfth operating mode, rotation of component 106 and component 108 in direction CD2 is blocked. Since rotation of component 106 and component 108 to rotation in direction CD2 is blocked, when rotational energy is applied to input gear 102 in direction RD2, there is no relative rotation between component 106 and component 108 in direction CD2, which blocks rotation of pinion gears 114 and 116 with respect to body portion 112, blocking rotation of shuttle 104 in direction CD2.

Figure 9:
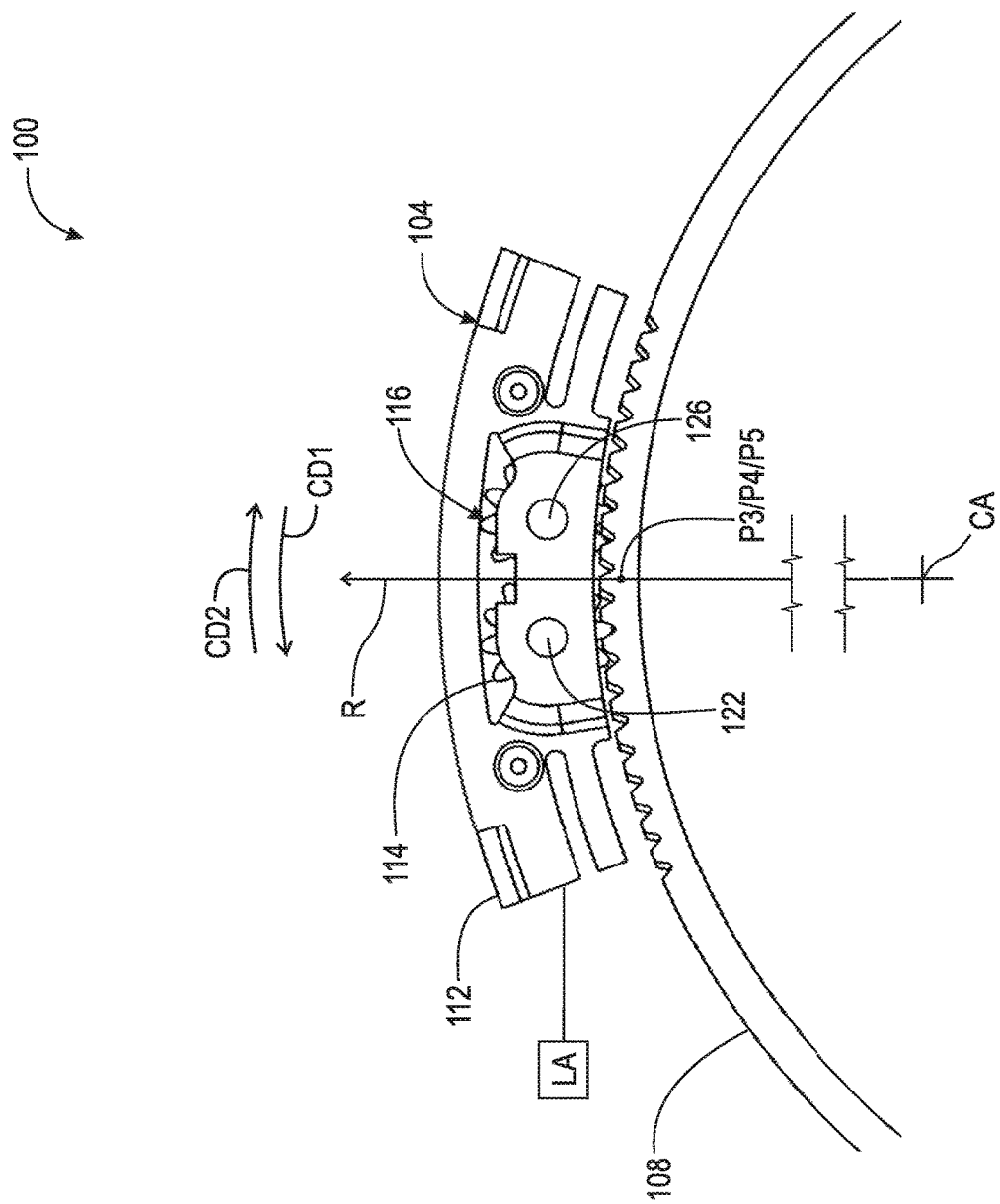
FIG. 9 is a front view of an example embodiment of a differential actuator in a neutral state.

FIG. 9 is a front view of an example embodiment of differential actuator 100 in a neutral state. The structure of differential actuator 100 in FIG. 9 is the same as the structure of differential actuator 100 in FIG. 1, with the following exception: input gear 102 and teeth 118 are removed and actuator A is a linear actuator schematically depicted in the figures that follow.

The neutral position of differential actuator 100 in FIG. 9 is a frame of reference for the operating modes of differential actuator 100 described below. In the neutral position of FIG. 9, plane P is co-linear with CA and passes through axis RA1, point P4 on component 106, and point P5 on component 108. Points P4 and P5 are axially stacked with point P3 on plane P. Due to the axial stacking of components 106 and 108, it is understood that in the front views of actuator 100, a circumferential position of point P4 is shown on component 108. For example: the starting point for the implementation of the operating modes described is the neutral position of differential actuator 100; and an amount of rotation of components 106 and 108 is measured from point P3 on plane P to points P4 and P5, respectively, in circumferential direction CD2.

Except as noted, for an operating mode of differential actuator 100 shown in FIG. 9: actuator A is arranged to rotate body portion 112 in one of opposite circumferential directions CD1 or CD2 around central axis CA; and pinion gear 114 and pinion gear 116 are arranged to rotate at least one of component 106 or component 108 around central axis CA.

Figure 10:
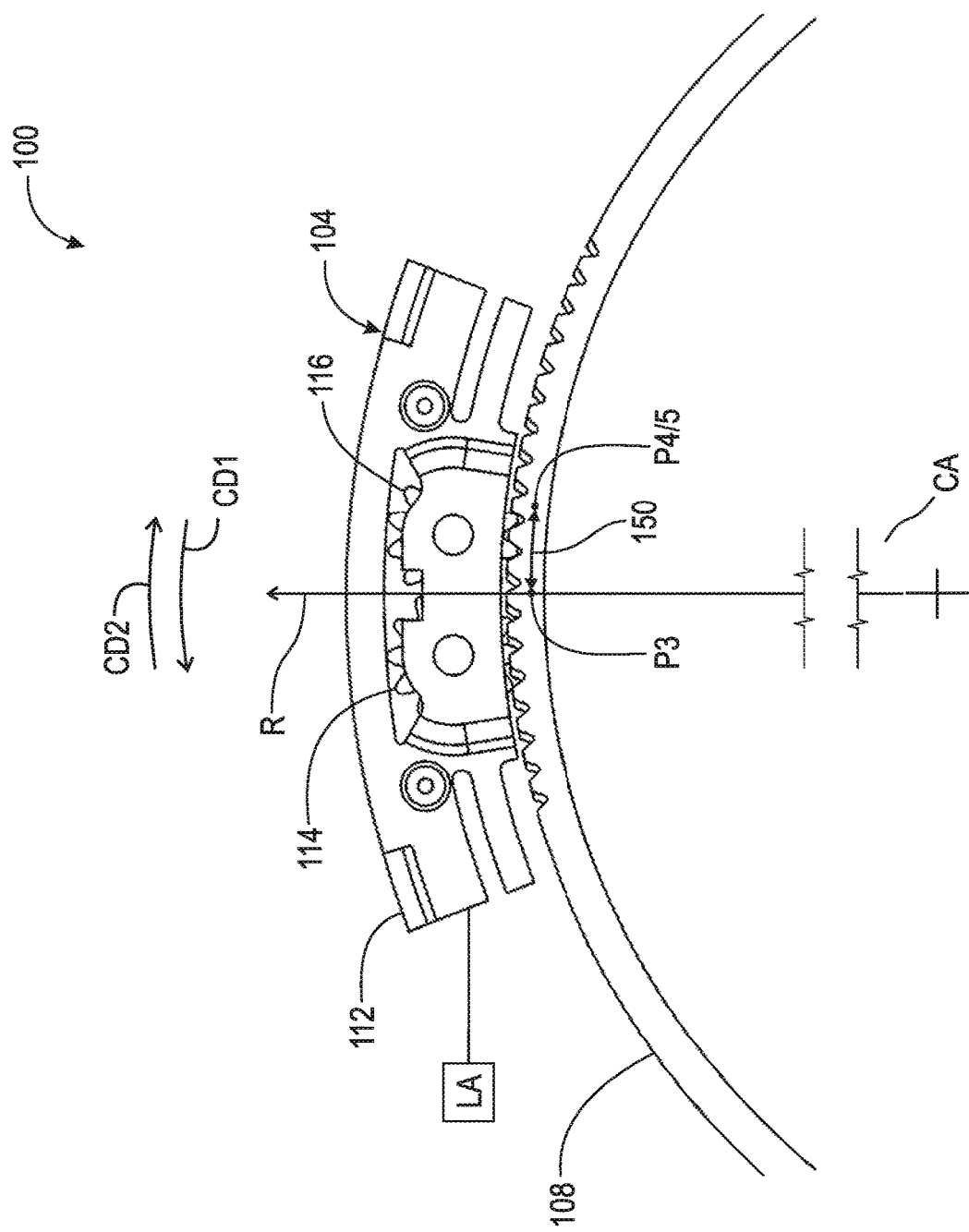
FIG. 10 is a front view of the differential actuator shown in FIG. 9 in a first operating mode.

FIG. 10 is a front view of differential actuator 100 shown in FIG. 9 in a first operating mode. For the first operating mode: component 106 and component 108 are free to rotate at least in direction CD2; resistance 146 of component 106 to rotation in direction CD2 is substantially equal to resistance 148 of component 108 to rotation in direction CD2 in the neutral position; actuator A is arranged to rotate shuttle 104 in direction CD2; and pinion gear 114 and pinion gear 116 rotate component 106 and component 108 in direction CD2, respectively. Since resistance 146 is substantially equal to resistance 148, there is no relative rotation between component 106 and component 108 in direction CD2, blocking rotation of pinion gear 114 and pinion gear 116 with respect to body portion 112. Thus, component 106 and component 108 rotate in unison and by same circumferential distance 150 in direction CD2.

Figure 11:
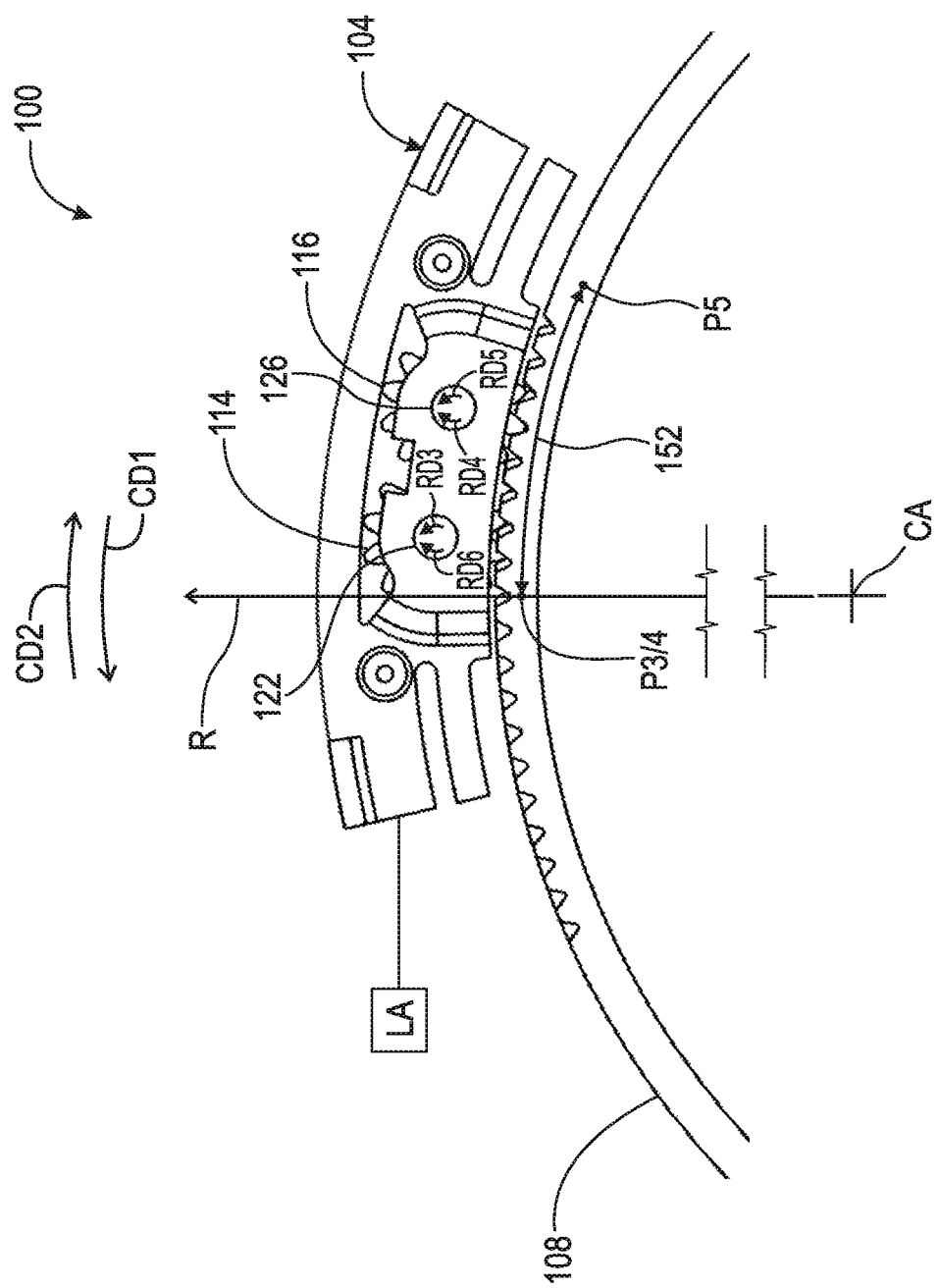
FIG. 11 is a front view of the differential actuator shown in FIG. 9 in a second operating mode.

FIG. 11 is a front view of differential actuator 100 shown in FIG. 9 in a second operating mode. For the second operating mode: rotation of component 106 in direction CD2 is blocked; component 108 is free to rotate at least in direction CD2; actuator A is arranged to rotate shuttle 104 in direction CD2; and pinion gear 116 rotates component 108 in direction CD2. Because rotation of component 106 in direction CD2 is blocked and component 108 is free to rotate at least in direction CD2, there is relative movement between component 108 and component 106, causing pinion gear 114 and pinion gear 116 to rotate with respect to body portion 112.

The rotation of shuttle 104 in direction CD2 causes pinion gear 116 to rotate in rotational direction RD5, rotating component 108 circumferential distance 152 in direction CD2. As shuttle 104 is rotated in direction CD2, blocked component 106 causes pinion gear 114 to rotate in rotational direction RD6 and to traverse fixed component 106 in direction CD2.

Figure 12:
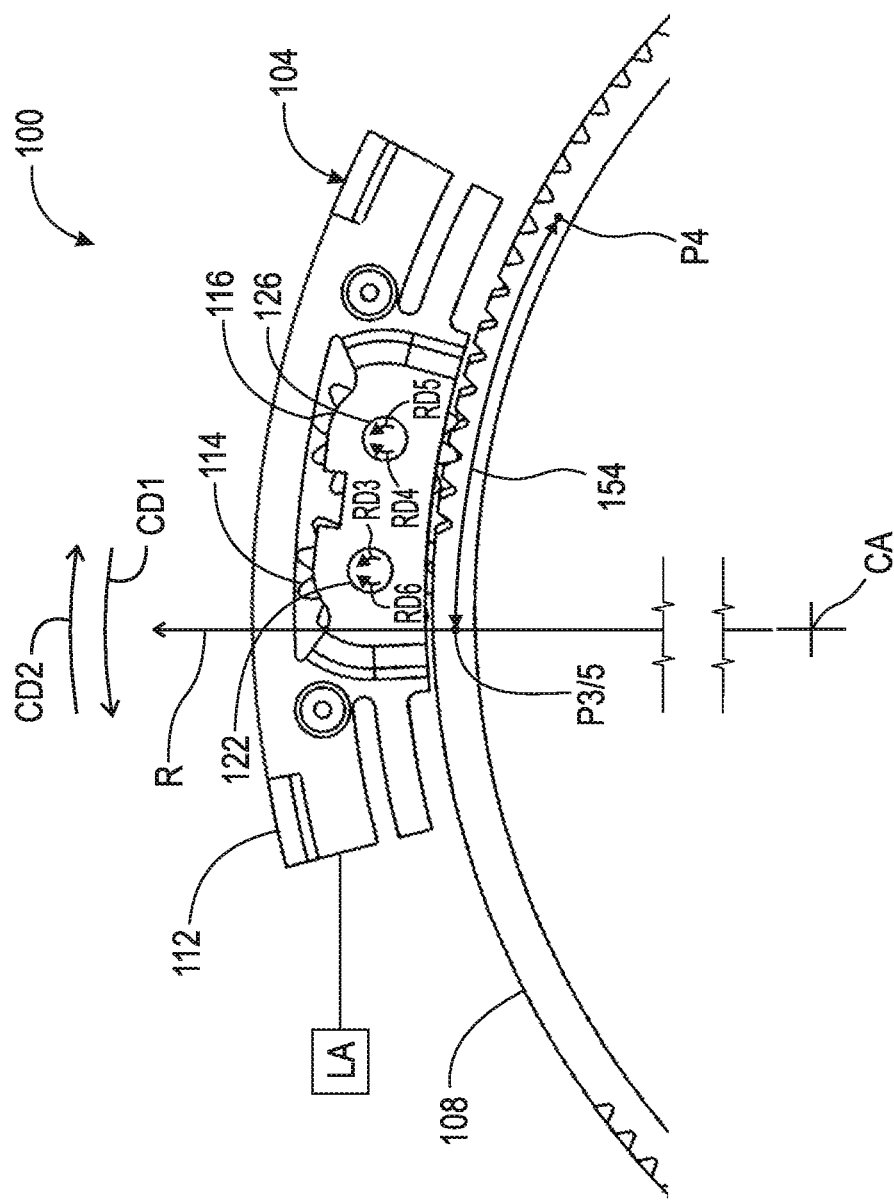
FIG. 12 is a front view of the differential actuator shown in FIG. 9 in a third operating mode.

FIG. 12 is a front view of differential actuator 100 shown in FIG. 9 in a third operating mode. For the third operating mode: rotation of component 108 in direction CD2 is blocked; component 106 is free to rotate at least in direction CD2; actuator A is arranged to rotate shuttle 104 in direction CD2; and pinion gear 114 rotates component 106 in direction CD2. Because rotation of component 108 in direction CD2 is blocked and component 106 is free to rotate at least in direction CD2, there is relative rotation between component 106 and component 108, causing pinion gear 114 and pinion gear 116 to rotate with respect to body portion 112.

The rotation of shuttle 104 in direction CD2 causes pinion gear 114 to rotate in rotational direction RD3, rotating component 106 circumferential distance 154 in direction CD1. As shuttle 104 is rotated in direction CD2, blocked component 108 causes pinion gear 116 to rotate in rotational direction RD4 and to traverse fixed component 108 in direction CD2.

Figure 13:
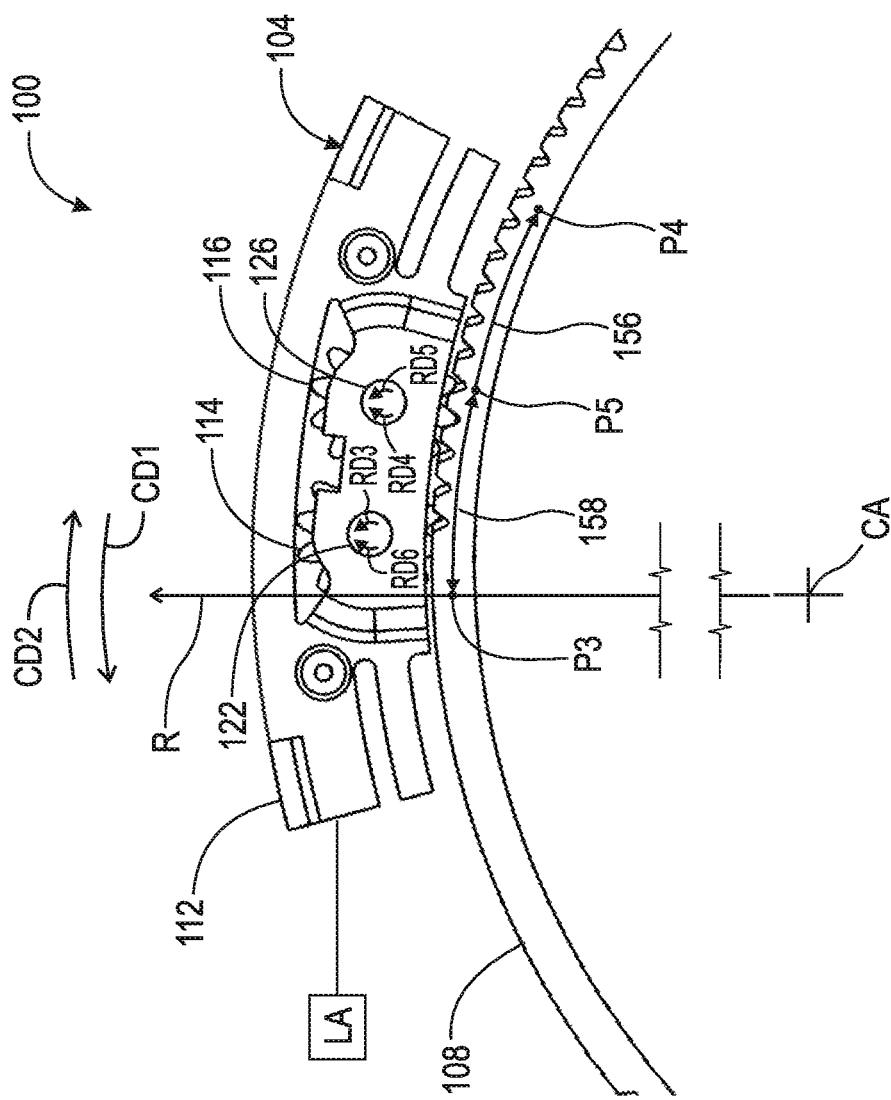
FIG. 13 is a front view of the differential actuator shown in FIG. 9 in a fourth operating mode; and, FIG. 14 is a front view of the differential actuator shown in FIG. 9 in a fifth operating mode.

FIG. 13 is a front view of the differential actuator shown in FIG. 9 in a fourth operating mode. For the fourth operating mode: resistance 146 of component 106 to rotation in direction CD2 is less than resistance 148 of component 108 to rotation in direction CD2; actuator A is arranged to rotate shuttle 104 in direction CD2; and pinion gear 114 and pinion gear 116 rotate component 106 and component 108, respectively, in direction CD2.

As shuttle 104 is rotated in direction CD2: pinion gear 114 is rotated in rotational direction RD3, rotating component 106 in direction CD2; and pinion gear 116 is rotated in rotational direction RD4, rotating component 108 in direction CD2. Since resistance 146 is less than resistance 148: pinion gear 114 rotates more rapidly than pinion gear 116; pinion gear 114 rotates component 106 by circumferential distance 156 in direction CD2; pinion gear 116 rotates component 108 by circumferential distance 158 in direction CD2; distance 156 is greater than distance 158; and a rate of rotation of component 106 in direction CD2 is greater than a rate of rotation of component 108 in direction CD2.

Figure 14:
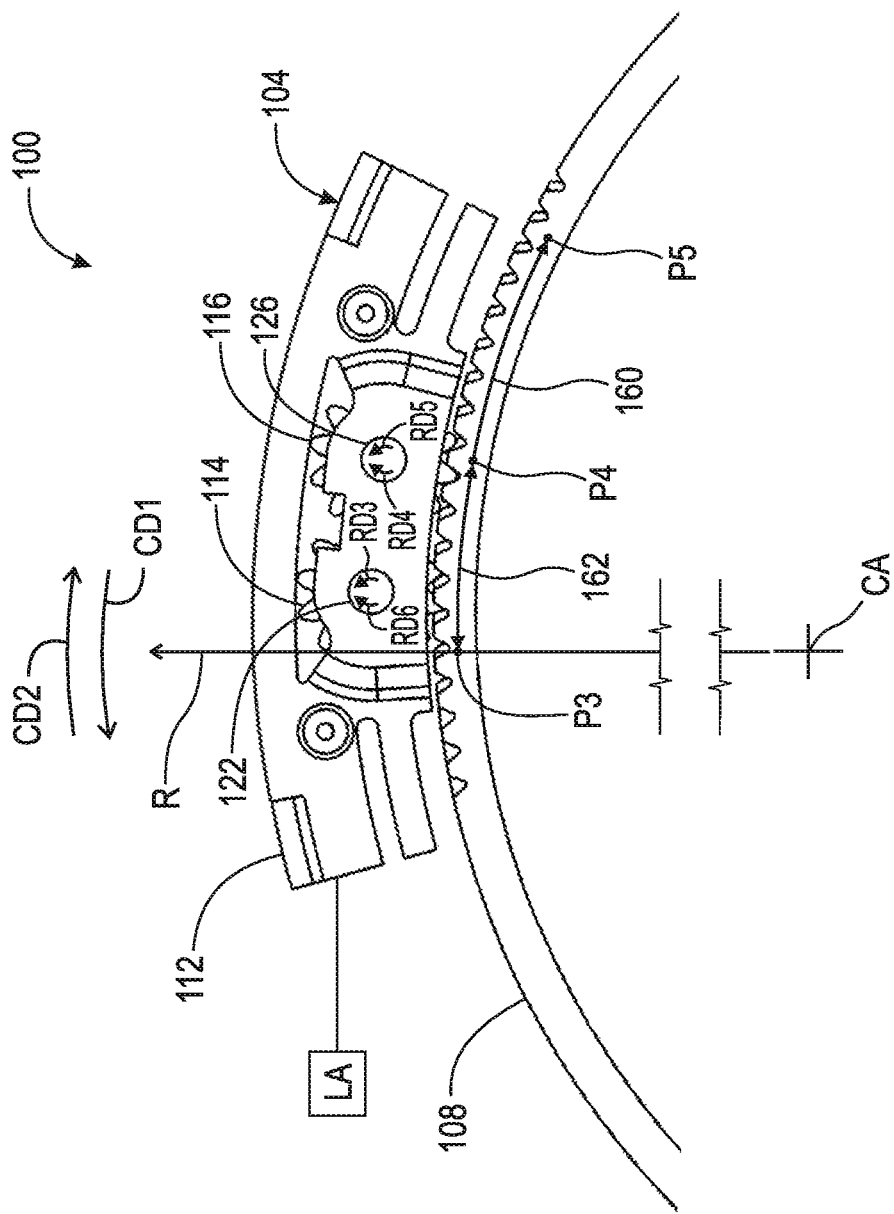

FIG. 14 a front view of differential actuator 100 shown in FIG. 9 in a fifth operating mode. For the fifth operating mode: resistance 146 of component 106 to rotation in direction CD2 is greater than resistance 148 of component 108 to rotation in direction CD2; actuator A is arranged to rotate shuttle 104 in direction CD2; and pinion gear 114 and pinion gear 116 rotate component 106 and component 108, respectively, in direction CD2.

As shuttle 104 is rotated in direction CD2: pinion gear 114 is rotated in rotational direction RD6, rotating component 106 in direction CD2; and pinion gear 116 is rotated in rotational direction RD5, rotating component 108 in direction CD2. Since resistance 148 is less than resistance 146: pinion gear 116 rotates more rapidly than pinion gear 114; pinion gear 116 rotates component 108 by circumferential distance 160 in direction CD2; pinion gear 114 rotates component 106 by circumferential distance 162 in direction CD2; distance 160 is greater than distance 162; and a rate of rotation of component 108 in direction CD2 is greater than a rate of rotation of component 106 in direction CD2.

FIG. 9 also depicts a sixth operating mode of differential actuator 100 shown in FIG. 9. For the sixth operating mode, rotation of component 106 and component 108 in direction CD2 is blocked. Since rotation of component 106 and component 108 in direction CD2 is blocked, when rotational energy is applied to shuttle 104 in direction RD2, there is no relative rotation between component 106 and component 108 in direction CD2, which blocks rotation of pinion gears 114 and 116 with respect to body portion 112, blocking rotation of shuttle 104 in direction CD2.

The inverse of the rotations and rotations discussed above for the first through sixth operating modes of differential actuator 100 shown in FIG. 9 is generally applicable to seventh through twelfth operating modes, respectively, of differential actuator 100 shown in FIG. 9. As with the first through sixth operating modes, the neutral position shown in FIG. 9 is the starting point for the seventh through twelfth operating modes.

For the seventh operating mode of the differential actuator shown in FIG. 9: component 106 and component 108 are free to rotate at least in direction CD1; resistance 132 of component 106 to rotation in direction CD1 is substantially equal to resistance 134 of component 108 to rotation in direction CD2; actuator A is arranged to rotate shuttle 104 in direction CD1; and pinion gear 114 and pinion gear 116 rotate component 106 and component 108 in direction CD1. Since resistance 132 is substantially equal to resistance 134, there is no relative rotation between component 106 and component 108 in direction CD1, and rotation of pinion gear 114 and pinion gear 116 with respect to body portion 112 is blocked. Thus, component 106 and component 108 rotate in unison and by a same circumferential distance in direction CD1.

For the eighth operating mode of differential actuator 100 shown in FIG. 9: rotation of component 106 in direction CD1 is blocked and component 108 is free to rotate at least in direction CD1; actuator A is arranged to rotate shuttle 104 in direction CD1; and pinion gear 116 rotates component 108 in direction CD1. Because rotation of component 106 in direction CD1 is blocked and component 108 is free to rotate at least in direction CD1, there is relative movement between component 106 and component 108, causing pinion gear 114 and pinion gear 116 to rotate with respect to body portion 112.

The rotation of shuttle 104 in direction CD1 causes pinion gear 116 to rotate in rotational direction RD4, rotating component 108 in direction CD1. As shuttle 104 is rotated in direction CD1, blocked component 106 causes pinion gear 114 to rotate in rotational direction RD3 and to traverse fixed component 106 in direction CD1.

For the ninth operating mode of differential actuator 100 shown in FIG. 9: rotation of component 108 in direction CD1 is blocked; component 106 is free to rotate at least in direction CD1; actuator A is arranged to rotate shuttle 104 in direction CD1; and pinion gear 114 rotates component 106 in direction CD1. Because rotation of component 108 in direction CD1 is blocked and component 106 is free to rotate at least in direction CD1, there is relative movement between component 106 and component 108, causing pinion gear 114 and pinion gear 116 to rotate with respect to body portion 112.

The rotation of shuttle 104 in direction CD1 causes pinion gear 114 to rotate in rotational direction RD6, rotating component 106 in direction CD1. As shuttle 104 is rotated in direction CD1, blocked component 108 causes pinion gear 116 to rotate in rotational direction RD5 and to traverse fixed component 108 in direction CD1.

For the tenth operating mode of differential actuator 100 shown in FIG. 9: a resistance of component 106 to rotation in direction CD1 is less than a resistance of component 108 to rotation in direction CD1; actuator A is arranged to rotate shuttle 104 in direction CD1; and pinion gear 114 and pinion gear 116 rotate component 106 and component 108, respectively, in direction CD1.

As shuttle 104 is rotated in direction CD1: pinion gear 114 is rotated in rotational direction RD6, rotating component 106 in direction CD1; and pinion gear 116 is rotated in rotational direction RD5, rotating component 108 in direction CD1. Since the resistance of component 106 to rotation in direction CD1 is less than the resistance of component 108 to rotation in direction CD1: pinion gear 114 rotates more rapidly than pinion gear 116; pinion gear 114 rotates component 106 by a greater distance in direction CD1 than pinion gear 116 rotates component 108 in direction CD1; and a rate of rotation of component 106 in direction CD1 is greater than a rate of rotation of component 108 in direction CD1.

For the eleventh operating mode of differential actuator 100 shown in FIG. 9: a resistance of component 106 to rotation in direction CD1 is greater than a resistance of component 108 to rotation in direction CD1; actuator A is arranged to rotate shuttle 104 in direction CD1; and pinion gear 114 and pinion gear 116 rotate component 106 and component 108, respectively, in direction CD1.

As shuttle 104 is rotated in direction CD1: pinion gear 114 is rotated in rotational direction RD3, rotating component 106 in direction CD1; and pinion gear 116 is rotated in rotational direction RD4, rotating component 108 in direction CD1. Since resistance of component 106 to rotation in direction CD1 is greater than resistance of component 108 to rotation in direction CD1: pinion gear 116 rotates more rapidly than pinion gear 114; pinion gear 116 rotates component 108 by a greater distance in direction CD1 than pinion gear 114 rotates component 106 in direction CD1; and a rate of rotation of component 108 in direction CD1 is greater than a rate of rotation of component 106 in direction CD1.

FIG. 9 substantially depicts the twelfth operating mode of differential actuator 100 shown in FIG. 9. For the twelfth operating mode, rotation of component 106 and component 108 in direction CD1 is blocked. Since rotation of component 106 and component 108 to rotation in direction CD1 is blocked, when rotational energy is applied to shuttle 104 in direction RD1, there is no relative rotation between component 106 and component 108 in direction CD1, which blocks rotation of pinion gears 114 and 116 with respect to body portion 112, blocking rotation of shuttle 104 in direction CD1.

The following should be viewed in light of FIGS. 1 through 14. The following describes a method of operating differential actuator 100 including: shuttle 104 with body portion 112; pinion gear 114; pinion gear 116; component 106; and component 108. A first step rotates, with actuator A, shuttle 104 in circumferential direction CD1 around central axis CA. A second step, facing differential actuator 100 in axial direction AD1, rotates pinion gear 114 in one of a clockwise or counter-clockwise direction with respect to body portion 112. A third step rotates, with pinion gear 114, component 106 in circumferential direction CD1 around central axis CA. A fourth step, facing differential actuator 100 in axial direction AD1, rotates pinion gear 116 in the other of the clockwise or counter-clockwise direction with respect to body portion 112. A fifth step rotates, with pinion gear 116, component 108 in circumferential direction CD1.

In an example embodiment: a sixth step rotates, with actuator A, shuttle 104 in circumferential direction CD2 around central axis CA; a seventh step, facing differential actuator 100 in axial direction AD1, rotates pinion gear 114 in one of the clockwise or counter-clockwise direction with respect to body portion 112; an eighth step rotates, with pinion gear 114, component 106 in circumferential direction CD2 around central axis CA; a ninth step, facing differential actuator 100 in axial direction AD1, rotates pinion gear 116 in the other of the clockwise or counter-clockwise direction with respect to body portion 112; and a tenth step rotates, with pinion gear 116, component 108 in circumferential direction CD2.

In a mechanical system, for example a mechanical system including differential actuator 100, increasing the number and type of options for actuating component, for example components 106 and 108, increases the value and utility of the system. Differential actuator 100 uses robust dependable differential type gearing to provide an "either this or that" or "this extent and that extent" type of actuation with a single torque source, for example actuator A, and without costly sensors.

For example, a system including differential actuator 100 requires component 106 and component 108 to be actuated/rotated in direction CD1 according to a degree of resistance to rotation in direction CD1 for components 106 and 108. Differential actuator 100 satisfies the preceding requirement using the inherent mechanical gearing characteristic of shuttle 104, pinion gears 114 and 116, and components 106 and 108, without further control intervention. For example, shuttle 104 is rotated in direction CD1 to transmit rotational force in direction CD1 to components 106 and 108. Initially, components 106 and 108 both rotate in direction CD1, with a speed/extent of rotation in direction CD1 dependent on the degree of resistance noted above. Further, if the rotation of one of component 106 or 108 in direction CD1 is blocked, the other of component 106 or can continue to be rotated. Stated alternatively, the speed and degree of rotation of components 106 and 108 can be optimized for component 106 or 108 having the least amount of resistance to rotation in direction CD1.

Thus, differential actuator 100 provides a robust mechanical system for selectively controlling a plurality of components to implement a plurality of operations, without the use multiple actuators and sensors, decreasing the cost and complexity of differential actuator 100, while increasing the durability and reliability of differential actuator 100. For example: a desired extent and rate of rotation of components 106 and 108 in direction CD1 is linked to/proportional to resistance to rotation of component 106 in direction CD1; and the simple displacement of shuttle 104 in direction CD1 and the self-regulating robust mechanical interaction of teeth on pinion gears 114 and 116 with teeth on components 106 and 108 provides the desired extent and rate of rotation of components 106 and 108 without the need for outside control, sensors, or more than one actuator.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

A actuator
AD1 axial direction
AD1 axial direction
CA central axis
CD1 circumferential direction
CD2 circumferential direction
EP end point, plane
L1 straight line
P plane
P1 point, component 106
P2 point, component 108
P3 point, plane P
P4 point, component 106

P5 point, component 108
RA1 rotational axis
RD1 rotational direction
RD2 rotational direction
RD3 rotational direction
RD4 rotational direction
RD5 rotational direction
RD6 rotational direction
100 differential actuator
102 input gear
104 shuttle
106 component
108 component
110 gear tooth, input gear
112 body portion
114 pinion gear
116 pinion gear
118 tooth, body portion
120 gear teeth, pinion gear 114
122 pinion axle, pinion gear 114
124 gear teeth, pinion gear 116
126 pinion axle, pinion gear 116
128 tooth, component 106
130 tooth, component 108
132 resistance to rotation, component 106
134 resistance to rotation, component 108
136 circumferential distance
137 circumferential distance
138 circumferential distance
139 circumferential distance
140 circumferential distance
142 circumferential distance
144 circumferential distance
146 resistance to rotation, component 106
148 resistance to rotation, component 108
150 circumferential distance
152 circumferential distance
154 circumferential distance
156 circumferential distance
158 circumferential distance
160 circumferential distance
162 circumferential distance

The invention claimed is:

1. A differential actuator, comprising:
a shuttle supported for rotation around a central axis, the shuttle including:
a body portion;
a first pinion gear connected to the body portion; and,
a second pinion gear connected to the body portion;
a first component:
including a first plurality of teeth meshed with the first pinion gear; and,
supported for rotation around the central axis; and,
a second component:
including a second plurality of teeth meshed with the second pinion gear; and,
supported for rotation around the central axis, wherein for a first operating mode of the differential actuator:
the shuttle is arranged to be rotated by an actuator in a first circumferential direction around the central axis; and,
the first pinion gear is arranged to rotate the first component in the first circumferential direction around the central axis.

2. The differential actuator of claim 1, wherein for the first operating mode, the first pinion gear is arranged to rotate with respect to the body portion.

3. The differential actuator of claim 1, wherein for the first operating mode, rotation of the first pinion gear with respect to the body portion is blocked.

4. The differential actuator of claim 1, wherein for the first operating mode, the second pinion gear is arranged to rotate the second component in the first circumferential direction around the central axis.

5. The differential actuator of claim 4, wherein for the first operating mode, the second pinion gear is arranged to rotate with respect to the body portion.

6. The differential actuator of claim 4, wherein for the first operating mode, rotation of the second pinion gear with respect to the body portion is blocked.

7. The differential actuator of claim 1, wherein for the first operating mode, the second component is not arranged to rotate around the central axis.

8. The differential actuator of claim 1, wherein for the first operating mode:
the second pinion gear is arranged to rotate the second component in the first circumferential direction around the central axis;
the first pinion gear is arranged to rotate with respect to the body portion; or,
the second pinion gear is arranged to rotate with respect to the body portion.

9. The differential actuator of claim 1, wherein for the first operating mode:
the second pinion gear is arranged to rotate the second component in the first circumferential direction around the central axis;
the first pinion gear is arranged to rotate with respect to the body portion; and,
the second pinion gear is arranged to rotate with respect to the body portion.

10. The differential actuator of claim 1, wherein for the first operating mode:
the second pinion gear is arranged to rotate the second component in the first circumferential direction around the central axis;
rotation of the first pinion gear with respect to the body portion is blocked; and,
rotation of the second pinion gear with respect to the body portion is blocked.

11. The differential actuator of claim 1, wherein for the first operating mode:
the second pinion gear is arranged to rotate the second component in the first circumferential direction around the central axis;
facing the differential actuator in an axial direction parallel to the central axis, the first pinion gear is arranged to rotate in one of a clock-wise or counter clock-wise direction with respect to the body portion; and,
facing the differential actuator in the axial direction, the second pinion gear is arranged to rotate in the other of the clock-wise or counter clock-wise direction with respect to the body portion.

12. The differential actuator of claim 1, wherein for the first operating mode, in response to a resistance of the first component to rotation around the central axis different from a resistance of the second component to rotation around the central axis:
the first pinion gear is arranged to rotate the first component a first distance in the first circumferential direction; and,
the second pinion gear is arranged to rotate the second component a second distance, different from the first distance, in the first circumferential direction.

13. The differential actuator of claim 12, wherein when the resistance of the first component to rotation around the central axis is greater than the resistance of the second component to rotation around the central axis, the second distance is greater than the first distance.

14. The differential actuator of claim 1, wherein for a second operating mode of the differential actuator:
the shuttle is arranged to be rotated, by the actuator, in a second circumferential direction, opposite the first circumferential direction, around the central axis; and,
the shuttle is arranged to rotate only the first component in the second circumferential direction around the central axis; or,
the first pinion gear is arranged to rotate the first component in the second circumferential direction and the second pinion gear is arranged to rotate the second component in the second circumferential direction.

15. The differential actuator of claim 14, wherein:
the shuttle is arranged to rotate only the first component in the second circumferential direction around the central axis;
the first pinion gear is arranged to displace the first component in the second circumferential direction; and,
the first pinion gear is arranged to rotate with respect to the body portion.

16. The differential actuator of claim 14, wherein:
the first pinion gear is arranged to rotate the first component in the second circumferential direction and the second pinion gear is arranged to rotate the second component in the second circumferential direction;
facing the differential actuator in an axial direction parallel to the central axis, the first pinion gear is arranged to rotate in one of a clock-wise or counter clock-wise direction with respect to the body portion; and,
facing the differential actuator in the axial direction, the second pinion gear is arranged to rotate in the other of the clock-wise or counter clock-wise direction with respect to the body portion.

17. The differential actuator of claim 14 wherein:
the first pinion gear is arranged to rotate the first component in the second circumferential direction and the second pinion gear is arranged to rotate the second component in the second circumferential direction;
the first pinion gear is arranged to rotate the first component a first distance in the second circumferential direction; and,
the second pinion gear is arranged to rotate the second component a second distance, different from the first distance, in the second circumferential direction.

18. A differential actuator, comprising:
a shuttle supported for rotation around a central axis, the shuttle including:
a body portion;
a first pinion gear connected the body portion; and,
a second pinion gear connected to the body portion;
a first component supported for rotation around the central axis and including a first plurality of teeth meshed with the first pinion gear; and,
a second component supported for rotation around the central axis and including a second plurality of teeth meshed with the second pinion gear, wherein:
for a first operating mode of the differential actuator:
the shuttle is arranged to be rotated, by an actuator, in a first circumferential direction around the central axis;
the first pinion gear is arranged to rotate the first component in the first circumferential direction;
the second pinion gear is arranged to rotate the second component in the first circumferential direction;
facing the differential actuator in an axial direction parallel to the central axis, the first pinion gear is arranged to rotate in one of a clockwise or counter-clockwise direction with respect to the body portion; and,
facing the differential actuator in the axial direction, the second pinion gear is arranged to rotate in the other of the clockwise or counter-clockwise direction with respect to the body portion; and,
for a second operating mode of the differential actuator:
the shuttle is arranged to be rotated, by the actuator, in a second circumferential direction, opposite the first circumferential direction, around the central axis; and,
the shuttle is arranged to rotate the first component, and not the second component, in the second circumferential direction around the central axis.

19. A method of operating a differential actuator including a shuttle with a body portion, a first pinion gear connected to the body portion, a second pinion gear connected to the body portion, a first component including a first plurality of teeth meshed with the first pinion gear, and a second component including a second plurality of teeth meshed with the second pinion gear, the method comprising:
rotating, with an actuator, the shuttle in a circumferential direction around a central axis;
facing the differential actuator in an axial direction parallel to the central axis, rotating the first pinion gear in one of a clockwise or counter-clockwise direction with respect to the body portion; and,
rotating, with the first pinion gear, the first component in the circumferential direction around the central axis.

20. The method of claim 19 further comprising:
rotating the second pinion gear in the other of the clockwise or counter-clockwise direction with respect to the body portion; and,
rotating, with the second pinion gear, the second component in the circumferential direction.

* * * * *